United States Patent
Hoiss et al.

(10) Patent No.: US 9,352,711 B2
(45) Date of Patent: May 31, 2016

(54) VEHICLE BODY

(71) Applicant: Bayerische Motoren Werke Aktiengesellschaft, Munich (DE)

(72) Inventors: Franz Hoiss, Bernried (DE); Herwig Kerstan, Maisach-Gernlinden (DE); Wilhelm Riedl, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/966,977

(22) Filed: Aug. 14, 2013

(65) Prior Publication Data

US 2013/0328334 A1    Dec. 12, 2013

Related U.S. Application Data (63) Continuation of application No. PCT/EP2012/005235, filed on Feb. 15, 2012.

(30) Foreign Application Priority Data

Feb. 15, 2011    (DE) .......................... 10 2011 004 105

(51) Int. Cl.
| | |
|---|---|
| *B60R 19/26* | (2006.01) |
| *B60R 19/24* | (2006.01) |
| *B62D 21/15* | (2006.01) |
| *B60R 19/00* | (2006.01) |
| *B60R 19/18* | (2006.01) |

(52) U.S. Cl.
CPC .............. *B60R 19/24* (2013.01); *B62D 21/152* (2013.01); *B60R 2019/007* (2013.01); *B60R 2019/186* (2013.01); *B60R 2019/247* (2013.01)

(58) Field of Classification Search
CPC ....................................................... B60R 19/26
USPC ....................................... 293/154; 296/187.1
See application file for complete search history.

(56) References Cited

U.S. PATENT DOCUMENTS

| | | | | |
|---|---|---|---|---|
| 3,578,358 | A * | 5/1971 | Reynolds ...................... | 280/500 |
| 3,708,195 | A * | 1/1973 | Kottsieper .................... | 293/125 |
| 4,635,982 | A | 1/1987 | Feldmann et al. | |
| 7,552,955 | B2 * | 6/2009 | Evans ........................... | 293/120 |
| 7,954,884 | B2 * | 6/2011 | Kosaka .................... | 296/187.09 |

(Continued)

FOREIGN PATENT DOCUMENTS

| | | |
|---|---|---|
| DE | 43 02 240 A1 | 8/1993 |
| DE | 198 35 705 A1 | 2/2000 |

(Continued)

OTHER PUBLICATIONS

German-language Search Report dated Aug. 24, 2011 with English translation (Ten (10) pages).

(Continued)

*Primary Examiner* — H Gutman
(74) *Attorney, Agent, or Firm* — Crowell & Moring LLP (57) ABSTRACT

A vehicle body has a longitudinal member and a bumper cross-member. Furthermore, the vehicle body has a cantilever, which extends transversely to the longitudinal member along a transverse vehicle axis and is fastened to the longitudinal member in a torque-resistant manner. The cantilever is arranged in such a way that the cantilever protrudes into an intermediate space between a wheel mount and the bumper cross-member.

17 Claims, 6 Drawing Sheets

(56) References Cited

U.S. PATENT DOCUMENTS

| | | | |
|---|---|---|---|
| 8,353,380 B2* | 1/2013 | Schonberger et al. | 180/274 |
| 8,480,130 B2* | 7/2013 | Dandekar et al. | 280/784 |
| 8,608,231 B1* | 12/2013 | Mendivil et al. | 296/187.03 |
| 8,746,764 B2* | 6/2014 | Parkila et al. | 293/133 |
| 8,888,168 B2* | 11/2014 | Kuwabara et al. | 296/187.09 |
| 8,985,258 B1* | 3/2015 | Midoun et al. | 180/274 |
| 2009/0302591 A1 | 12/2009 | Auer et al. | |
| 2011/0049915 A1* | 3/2011 | Kokubo | 293/132 |
| 2013/0234456 A1* | 9/2013 | Brockhoff et al. | 293/133 |

FOREIGN PATENT DOCUMENTS

| | | |
|---|---|---|
| DE | 198 51 495 A1 | 5/2000 |
| DE | 103 09 629 A1 | 9/2004 |
| DE | 10 2004 001 747 A1 | 8/2005 |
| DE | 10 2004 031 086 A1 | 1/2006 |
| DE | 10 2004 036 332 A1 | 3/2006 |
| EP | 0 192 940 A1 | 9/1986 |
| EP | 1 332 949 A2 | 8/2003 |
| WO | WO 2007/101285 A2 | 9/2007 |
| WO | WO 2009/072450 A1 | 6/2009 |

OTHER PUBLICATIONS

International Search Report dated May 23, 2012 with English translation (Six (6) pages).

* cited by examiner

VEHICLE BODY

CROSS REFERENCE TO RELATED APPLICATIONS

This application is a continuation of PCT International Application No. PCT/EP2012/052535, filed Feb. 15, 2012, which claims priority under 35 U.S.C. §119 from German Patent Application No. DE 10 2011 004 105.2, filed Feb. 15, 2011, the entire disclosures of which are expressly incorporated by reference herein.

BACKGROUND AND SUMMARY OF THE INVENTION

The present invention relates to a vehicle body and a vehicle with such a vehicle body.

A front region of a vehicle body typically has two longitudinal members, which extend in the longitudinal direction of the vehicle, and a bumper cross member, which is fastened to the ends of the longitudinal members of the vehicle. The bumper cross member extends more or less over the entire width of the vehicle or at least protrudes transversely beyond the longitudinal members. The longitudinal members usually extend inside the left and right wheel suspension or, more specifically, inside the left and right wheel wells and outside a drive unit. In the event of a frontal collision with minimal overlap, the vehicle impacts the obstacle outside of the respective longitudinal member.

Recently, there is a move towards improving the energy absorptivity of a vehicle body during a frontal collision with small overlap. WO 2009/072450 A1 provides additional body frame elements that extend in the longitudinal direction and are arranged outside the longitudinal members. These body frame elements extend from a bumper cross member over a wheel well up to an A pillar of the body. As a result, the energy is absorbed, in particular during impact with small overlap, not only by the conventional longitudinal member, but is also introduced by the bumper cross member over the wheel well as far as into the A pillar.

An object of the present invention is to provide a vehicle body that makes it possible to improve the introduction of energy into a longitudinal member in the case of a frontal collision with small overlap.

This and other objects are achieved by a vehicle body comprising a longitudinal member and a bumper cross member. The vehicle body has a cantilever support member that extends transversely to the longitudinal member along a transverse axis of the vehicle and that is fastened in a torque resistant manner to the longitudinal member. In this case, the cantilever support member is arranged such that it protrudes into an intermediate space between a wheel mount and the bumper cross member. To do so, the bumper cross member projects beyond the longitudinal member in the transverse direction of the vehicle body.

Consequently, a cantilever support member within the context of the invention is a support member that is fixed on one side. The cantilever support member projects from the longitudinal member in the direction of the outside or exterior of the vehicle. The bumper cross member is preferably fastened to a front end of the longitudinal member.

The arrangement according to the invention provides that in the event of a frontal collision of the vehicle body with small overlap, not only the bumper cross member, but also the cantilever support member can absorb energy and can deflect this energy into the longitudinal member due to its being fastened to the longitudinal member.

If there exists a defined distance between the bumper cross member and the cantilever support member, then first the bumper cross member is deformed until it strikes against the cantilever support member; and then, secondly, this cantilever support member supports, as required, the bumper cross member and deflects the energy into the longitudinal member.

A frontal collision with small overlap within the context of the present invention is a frontal collision of the vehicle body with an obstacle, where the obstacle is located in essence laterally outward relative to a longitudinal axis of the longitudinal member, i.e. on a side of the longitudinal member, on which a wheel mount may be found.

The expression "in essence transversely to the longitudinal member" means that the cantilever support member can also extend at an angle deviating from the transverse axis of the vehicle, but it is more or less directed along the transverse axis of the vehicle.

The bumper cross member may be a rear or a front bumper cross member of the vehicle body. The wheel mount may be a left or a right wheel mount. Furthermore, the longitudinal member may be a left or right longitudinal member.

The present invention provides that in the event of a frontal collision with small overlap, the cantilever support member may serve to absorb energy and to introduce this energy into the longitudinal member. A frontal collision with small overlap may be defined as an overlap of the vehicle body of about 25% or less in the direction of travel of the vehicle.

According to a further development of the present invention, the cantilever support member is a body element that is produced separately from the longitudinal member. In particular, the cantilever support member can be connected to the longitudinal member as a separate body element by way of a welded joint, a riveted joint and/or a threaded joint.

This feature allows the present invention to be applied to existing vehicle bodies or, more specifically, to the vehicle bodies known from the prior art. In this case only the additional cantilever support member is fastened to the existing longitudinal member.

Furthermore, the present invention provides that a switchable structural element can be arranged between a free end of the cantilever support member and a bumper cross member. The free end of the cantilever support member is the end of the cantilever support member that is not fastened to the longitudinal member. Hence, it is the end of the cantilever support member that is not clamped. A switchable structural element is a structural element of the vehicle body that exhibits varying, selectable properties independently of a specific boundary condition, such as the strength of the impact.

Especially in the case of the vehicle body according to the invention, the switchable structural element may be constructed in such a way that in the case of an impact at a speed that is greater than or equal to a threshold speed, the switchable structural element is essentially rigid, and that in the case of an impact at a speed that is less than the threshold speed, the switchable structural element is movable. The expression "essentially rigid" in this context means that the switchable structural element is not movable, but may well include a deformability at high load levels.

Consequently, in the event of a frontal collision below the threshold speed, only the bumper cross member is initially stressed, so that no energy can be introduced into the longitudinal member by way of the cantilever support member. In the case of a speed that is greater than or equal to the threshold speed, the energy is transferred directly from the bumper cross member to the free end of the cantilever support member and, thus, to the longitudinal member.

According to an additional further development of the present vehicle body, a support element can be arranged on a side of the longitudinal member that is located opposite the cantilever support member in such a way that the longitudinal member is laterally supported when the cantilever support member is subjected to stress due to a frontal collision.

Especially in the event of the above described frontal collision with small overlap, the energy is introduced, as explained, into the longitudinal member by way of the cantilever support member. In particular, a torque that can cause a lateral bending or buckling of the longitudinal member is applied to the connection between the cantilever support member and the longitudinal member. The support element can counteract this lateral deformation or lateral buckling of the longitudinal member by laterally supporting the longitudinal member on the other side, i.e. the inner side of the vehicle. The support element can support, for example, the longitudinal member on a drive unit, such as an engine block. As a result, the energy absorptivity of the longitudinal member as a whole is increased, and the drive unit also absorbs the collision energy.

According to a further development of the present invention, the vehicle body can include a tension element that connects a free end of the cantilever support member to a bumper cross member in the region of the longitudinal member.

A tension element in the context of the invention means that it involves a structural element that can be subjected in essence only to tension and on compression cannot absorb any significant amount of energy. One end of the tension element is connected to the free end of the cantilever support member. The other end of the tension element is connected to the bumper cross member in the region of the longitudinal member. Thus, the tension element extends obliquely from the free end of the cantilever support member in the direction of the longitudinal member to the front. "In the region of the longitudinal member" means that the tension element is fastened to the bumper cross member in a region, where the bumper cross member is attached to the longitudinal member.

If in the case of a frontal collision with small overlap the cantilever support member is subjected to stress, then the tension element, which is attached to the bumper cross member, is subjected to tension and allows the cantilever support member and/or the longitudinal member to absorb more energy. As a result, the tension element enables an improvement in the energy absorption in the event of a frontal collision with small overlap. According to a preferred further development of the invention, the vehicle body has a left and a right longitudinal member as well as a left and a right cantilever support member.

The left cantilever support member projects from the left longitudinal member in the transverse direction of the vehicle to the left, whereas the right cantilever support member projects from the right longitudinal member in the transverse direction of the vehicle to the right.

This feature allows the vehicle body to exhibit an improved energy absorptivity both in the event of a frontal collision with small overlap on the left side, i.e. a left frontal collision, as well as also in the event of a frontal collision with small overlap on the right side, i.e. a right frontal collision.

According to a preferred further development of the present invention, in particular of the vehicle body with a left and a right longitudinal member and a left and a right cantilever support member, the free end of the right cantilever support member is connected to a free end of the left cantilever support member by way of a tension element. Furthermore, the tension element of this further development extends around the front ends of the right and left longitudinal member.

Thus, in the course of a frontal collision with small overlap the tension element is subjected to stress in such a way that it pulls at the free end of the right cantilever support member. Hence, in the event of a left frontal collision the right cantilever support member and, thus, also the right longitudinal member act as an additional support and can also absorb energy when the left cantilever support member is subjected to stress. Such an approach can increase even more the energy absorptivity of the vehicle body during a frontal collision with small overlap.

According to a further development of the vehicle body, wherein the tension element connects the free ends of the left and the right cantilever support member to each other, the tension element extends around the entire bumper cross member. Therefore, in the event of a frontal collision with small overlap, the deformation of the bumper cross member also acts on the tension element in the form of subjecting the tension element to stress, so that the energy absorption of the vehicle body is further improved. As described above, this feature also allows energy to be dissipated over the right longitudinal member in the case of a left frontal collision.

According to a further development of the vehicle body of the present invention, the front end of the right cantilever support member is connected to a front end of a right support strut of a right wheel well by way of a right tension element of the wheel well. Furthermore, the front end of the left cantilever support member is connected to a front end of a left support strut of a left wheel well by way of a left tension element of the wheel well.

Thus, in the event of a right frontal collision, the left tension element of the wheel well is subjected to stress, so that the left cantilever support member as well as the left support strut of the left wheel well can absorb energy. Conversely, the right wheel well tension element is subjected to stress during a left frontal collision, so that the right cantilever support member and the right support strut of the right wheel well can absorb energy.

The above described tension elements, including the tension elements of the wheel well, may be cables or bands. The bands can be formed from a woven fabric.

Other objects, advantages and novel features of the present invention will become apparent from the following detailed description of one or more preferred embodiments when considered in conjunction with the accompanying drawings.

DETAILED DESCRIPTION OF THE DRAWINGS

Some exemplary embodiments of the present invention shall be described in detail below with reference to the figures.

Figure 1:
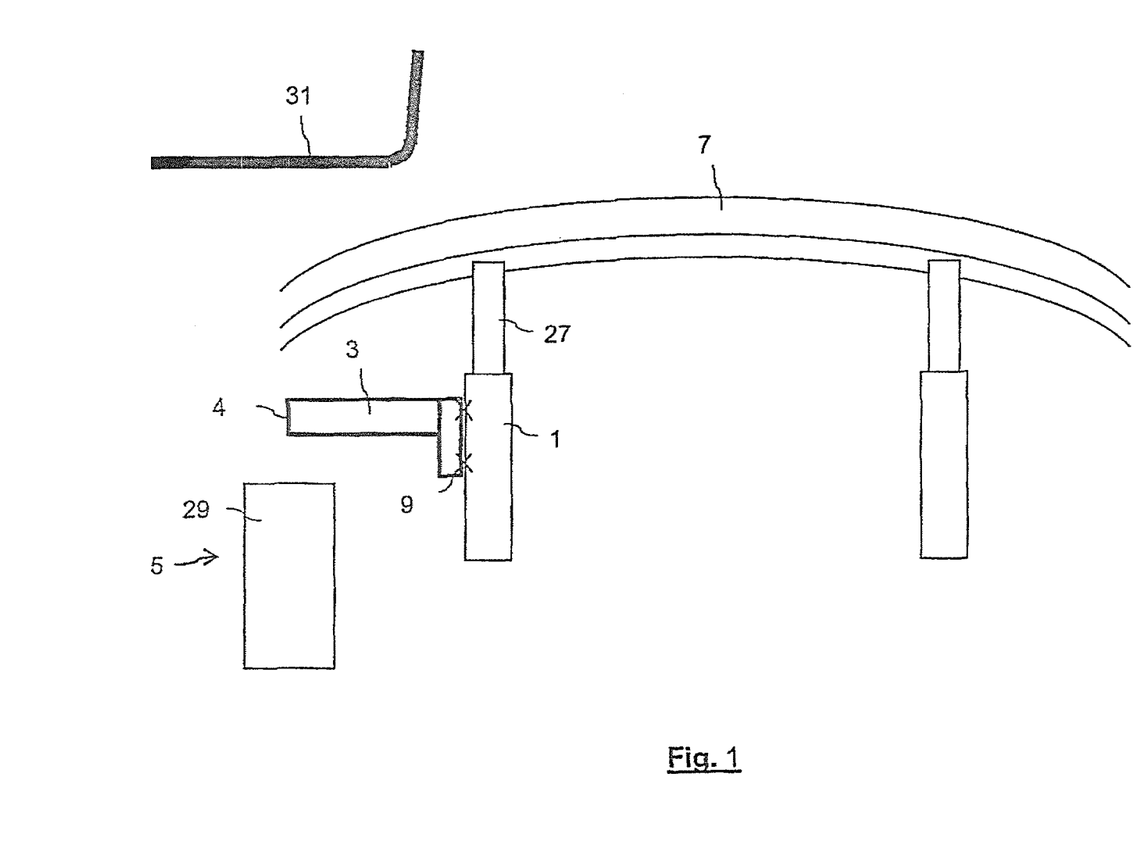
FIG. 1 is a schematic plan view of a front region of a vehicle body according to a first exemplary embodiment of the present invention.

FIG. 1 is a plan view of a front region of a vehicle body according to a first exemplary embodiment of the present invention. In particular, a left longitudinal member 1, a left cantilever support member 3 with a free end 4, a left wheel mount region 5 and a bumper cross member 7 are shown. The cantilever support member 3 is fastened to a left side of the longitudinal member 1, i.e. the side facing the one wheel mount 5, by way of a fastening device 9. The bumper cross member 7 is fastened to a deformation unit 27, which forms the front end of the longitudinal member 1. In the region of the wheel mount 5 there is a left wheel 29. The cantilever support member 3 protrudes into the intermediate space between the bumper cross member 7 and the wheel 29.

Furthermore, FIG. 1 shows an obstacle 31, which has a small overlap with respect to the vehicle body. In particular, the overlap of the obstacle 31 with the vehicle body occurs laterally outward from the left longitudinal member 1 and is approximately 25% of the width of the vehicle.

When the vehicle collides with the obstacle 31 that is depicted, the left outer region of the bumper cross member 7 is initially deformed in the direction of the cantilever support member 3 or, more specifically, in the direction of the wheel 29 until it strikes against the cantilever support member 3. Due to the fact that the cantilever support member 3 is fastened in a torque resistant manner to the longitudinal member 1, the collision energy is introduced into the longitudinal member 1 by way of the cantilever support member 3.

Figure 2:
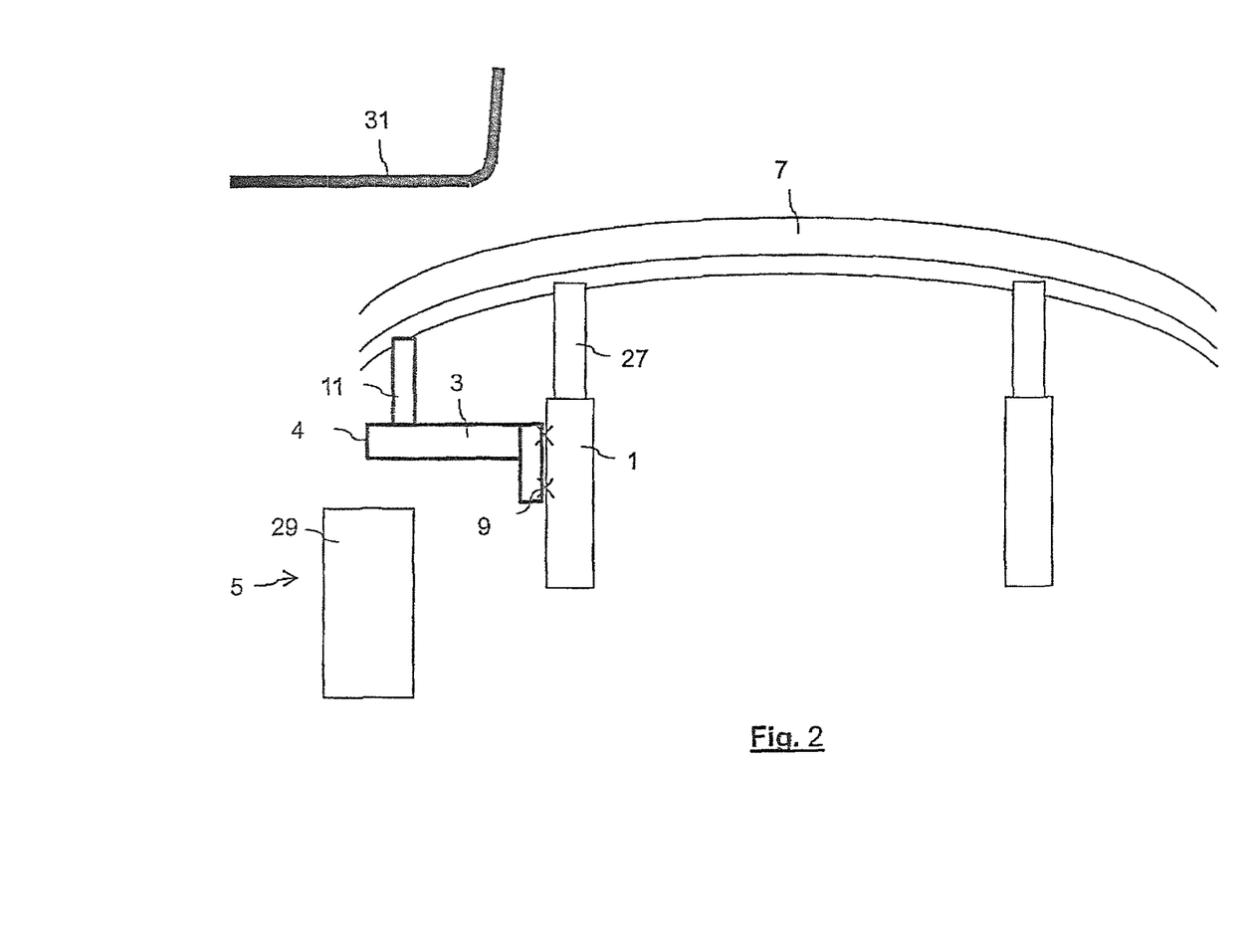
FIG. 2 is a schematic plan view of a front region of a vehicle body according to a second exemplary embodiment of the present invention.

FIG. 2 is a schematic plan view of a front region of a vehicle body according to a second exemplary embodiment of the present invention. Described below are in essence the features that are different from the features of the first exemplary embodiment.

It can be seen in FIG. 2 that a structural element 11 is arranged in the region of a free end 4 of the cantilever support member 3. In particular, the structural element 11 is arranged and fastened between the bumper cross member 7 and the end 4 of the cantilever support member 3. The structural element 11 extends more or less in the longitudinal direction of the vehicle.

In the case of a left frontal collision with an obstacle 31, a left region of the bumper cross member 7 is pressed against the structural element 11 and exerts a force on the structural element. As a result, the structural element 11 in turn exerts a force on the end 4 of the cantilever support member 3. Thus, the energy is introduced in the longitudinal member 1 by way of the structural element 4 and the cantilever support member 3.

The structural element 11 is designed to be switchable. In particular, it is essentially rigid above a threshold speed of the vehicle body, so that in the case of a frontal collision, a controlled energy transfer from the bumper cross member 7 to the cantilever support member 3 takes place. "Essentially rigid" in this context means that the structural element 11 is deformable at a high load level of, for example 40 to 80 kN, i.e. subject to the action of a defined force.

At a speed of the vehicle body equal to or less than the threshold speed, the structural element is movable or flexible in any manner at least in its longitudinal direction, i.e. in the longitudinal direction of the vehicle, so that in the event of a frontal collision, no collision energy can be transferred initially to the cantilever support member 3, and only the bumper cross member 7 is deformed. Thus, at speeds equal to and less than the threshold speed, damage to the longitudinal member can be avoided.

Figure 3:
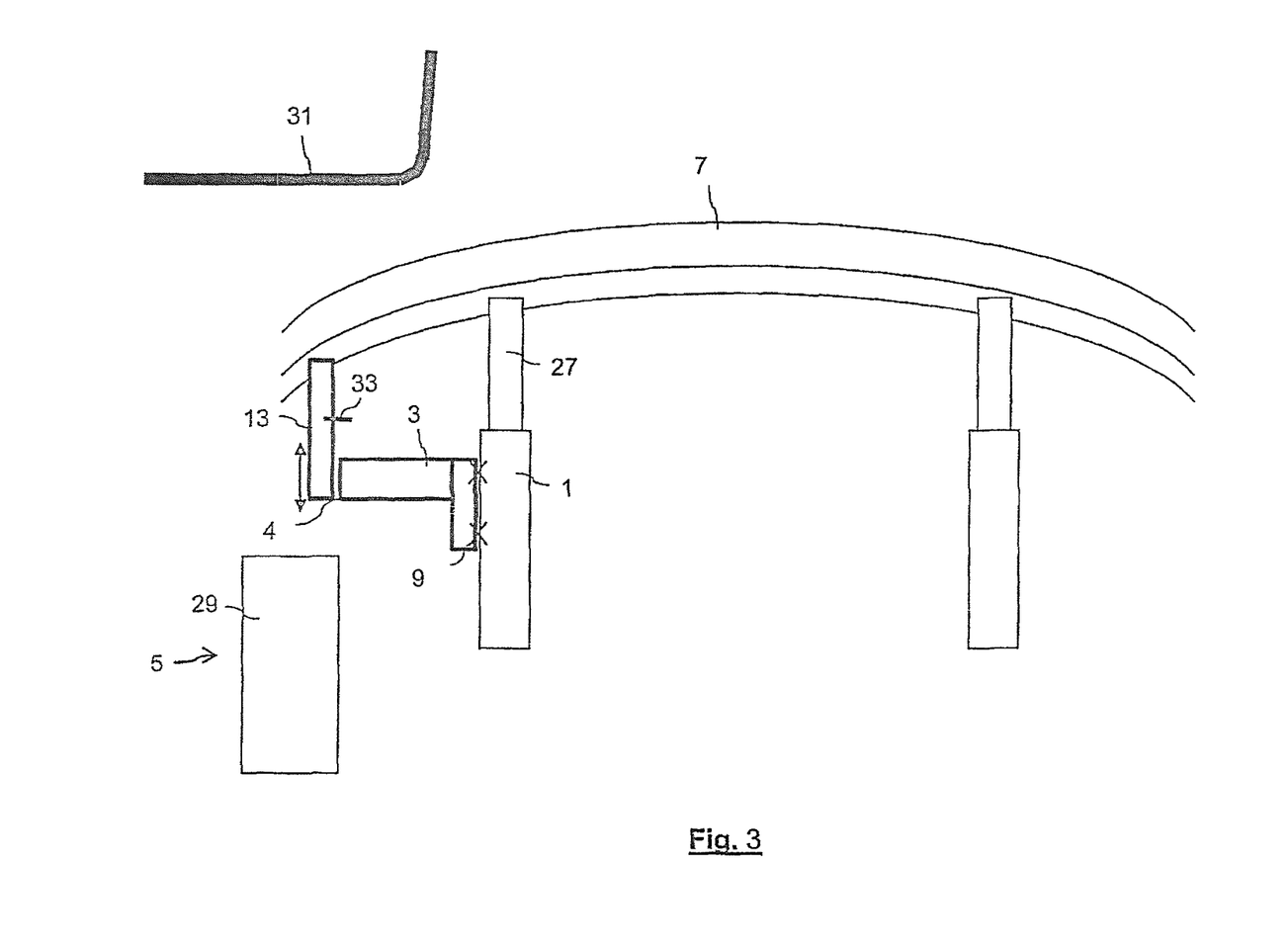
FIG. 3 is a schematic plan view of a front region of a vehicle body according to a third exemplary embodiment of the present invention.

FIG. 3 is a schematic plan view of a front region of a vehicle body according to a third exemplary embodiment of the present invention. Described below are, in particular, the differences with respect to the first and second exemplary embodiment, whereas the description of identical features has been omitted.

FIG. 3 shows a structural element 13, which is fastened to a front end 4 of a cantilever support member 3. The structural element 13 extends in the longitudinal direction of the vehicle and is arranged between the front end 4 and a bumper cross member 7. The structural element 13 is designed so as to be displaceable or movable relative to the front end 4 of the cantilever support member 3 in the longitudinal direction of the vehicle. In particular, the structural element 13 can be displaced so far with respect to the cantilever support member 3 until a stop 33 strikes against the front end 4 of the cantilever support member 3. If the stop 33 hits the front end 4 of the cantilever support member 3, then the structural element 13 represents an essentially rigid connection with respect to the cantilever support member 3. "Essentially rigid" in this context means that the structural element 13 is deformable at a high load level of, for example 40 to 80 kN, i.e. subject to the action of a defined force.

Thus, in the case of a frontal collision with an obstacle 31, the structural element 13 is moved up to a certain extent without the structural element 13 being able to absorb a load, whereas the left region of the bumper cross member 7 is deformed in the direction of the left vehicle wheel 29. As soon as the stop 33 strikes against the cantilever support member 3, the collision energy is transferred directly from the bumper cross member 7 over the structural element 13 to the cantilever support member 3 and, thus, to a left longitudinal member 1.

At the same time the connection of the structural element 13 to the bumper cross member 7 enables a defined or at least guided deformation of the bumper cross member 7 in the direction of the cantilever support member 3 in the case of a collision. Thus, a deformation of the bumper cross member 7 in a direction above or below the cantilever support member 3 is avoided.

Figure 4:
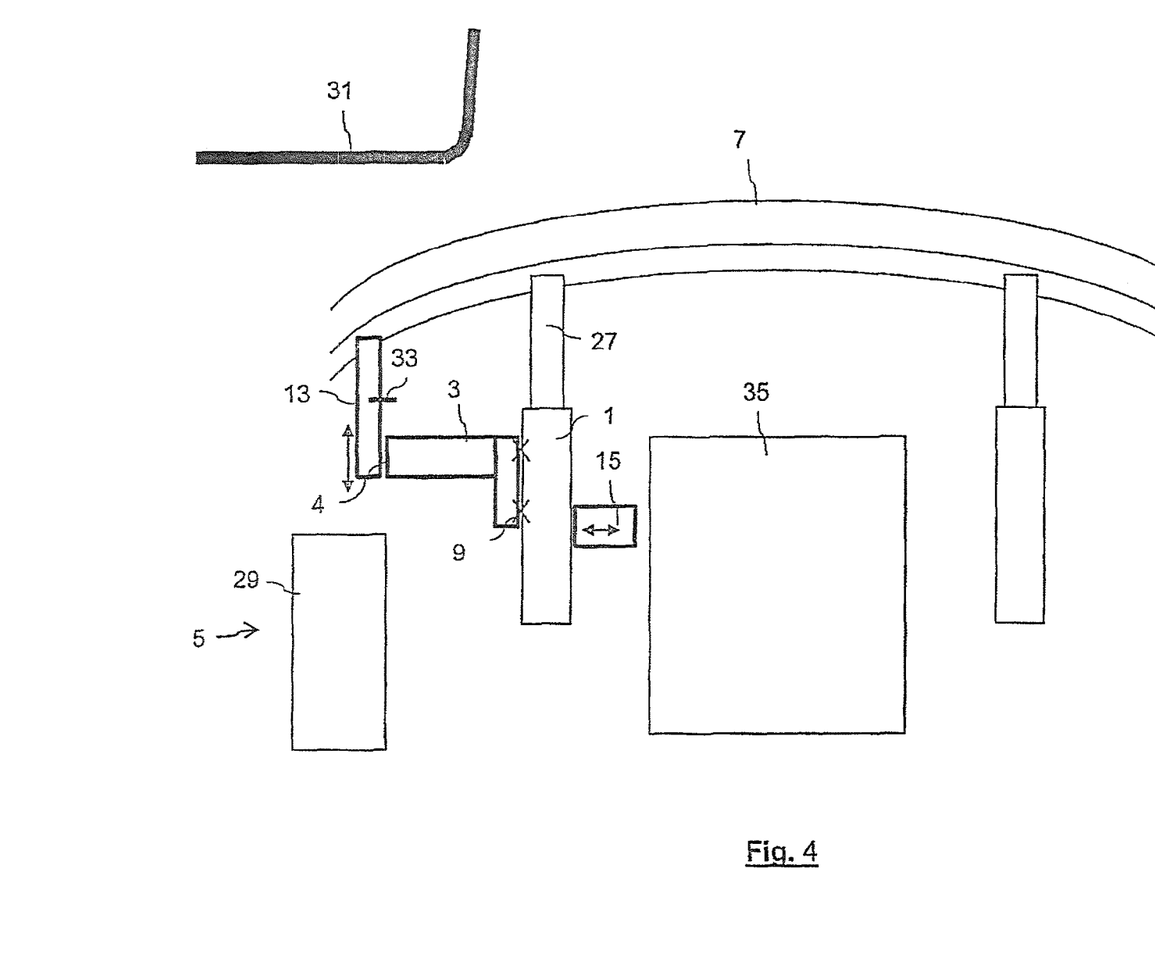
FIG. 4 is a schematic plan view of a front region of a vehicle body according to a fourth exemplary embodiment of the present invention.

FIG. 4 is a schematic plan view of a front region of a vehicle body according to a fourth exemplary embodiment of the present invention. The fourth exemplary embodiment represents a further development of the third exemplary embodiment, so that only the differences with respect to the third exemplary embodiment are described below, and the explanations regarding the features that are identical to the features of the third exemplary embodiment have been omitted.

According to the fourth exemplary embodiment, a supporting structural element 15 is arranged between a left longitudinal member 1 and a drive unit 35, such as an internal combustion engine. A structural element 13 and a cantilever support member 3 are arranged analogous to the third exemplary embodiment.

In the case of a left frontal collision 31 with small overlap, the energy is introduced into the left longitudinal member 1 from a bumper cross member 7 by way of the structural element 13 and the cantilever support member 3. In this case a torque is applied, in particular, to the left longitudinal member 1, as described in relation to the first exemplary embodiment. This torque can cause the left longitudinal member 1 to buckle and/or to bend in the direction of the drive unit 35. In the case of the fourth exemplary embodiment this buckling of the left longitudinal member 1 is prevented or at least attenuated by the support element 15. Furthermore, the support element 15 transfers the collision energy to the drive unit 35; or more specifically the longitudinal member 1 improves the energy absorption due to the fact that the longitudinal member does not buckle.

The support element 15 can also be combined with the other exemplary embodiments that are described above and below.

The first, second and third exemplary embodiments are described, in particular, with respect to a left front region of a vehicle body and a left frontal collision. It goes without saying that these embodiments also relate in an analogous manner to a right front region of a vehicle body and a right frontal collision.

Figure 5:
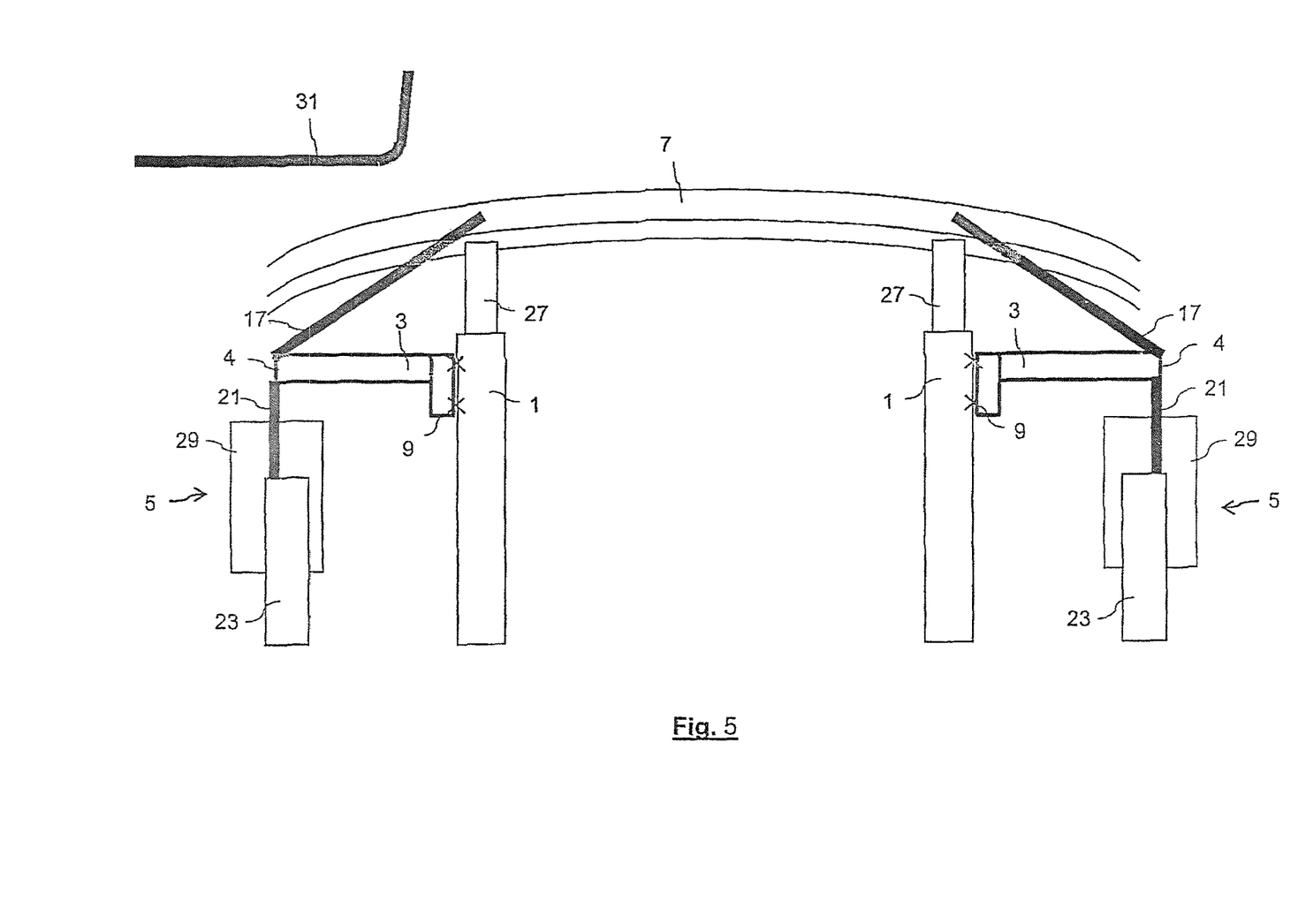
FIG. 5 is a schematic plan view of a front region of a vehicle body according to a fifth exemplary embodiment of the present invention.

FIG. 5 is a schematic plan view of a front region of a vehicle body according to a fifth exemplary embodiment of the present invention. In particular, the differences between the fifth exemplary embodiment and the first exemplary embodiment are described below.

In particular, FIG. 5 shows the left and right front region of the vehicle body. It can be seen that the present invention can be configured on a vehicle body in such a way that this configuration is completely symmetrical.

In particular, the vehicle body has a right and left longitudinal member 1 having a right and/or a left deformation unit 27, a right and left cantilever support member 3 having a right and/or left fastening device 9, a right and left wheel mount 5, a right and left wheel 29 as well as a bumper cross member 7.

Furthermore, FIG. 5 shows that a left and a right tension band 17 is arranged between the left and/or right cantilever support member 3 and the bumper cross member 7. In particular, a rear end of the left and/or right tension band 17 is connected to a free end 4 of the left and/or right cantilever support member 3; and a front end of the left and/or right tension band 17 is connected to the bumper cross member 7. In particular, the front ends of the left and/or right tension band 17 are fastened to the bumper cross member 7 in a region of the left and/or right longitudinal member 1, i.e. in a region, where the bumper cross member 7 is mounted on the left and/or right longitudinal member 1.

Furthermore, the vehicle body has a left wheel well tension band 21 and a right wheel well tension band 21. A front end of the left wheel well tension band 21 is connected to the free end 4 of the left cantilever support member 3. A rear end of the left wheel well tension band 21 is connected to a free front end of a left wheel well carrier 23. A front end of a right wheel well tension band 21 is connected to the free end 4 of the right cantilever support member 3. A rear end of the right wheel well tension band 21 is connected to a free front end of a right wheel well carrier 23.

In the case of a left frontal collision with an obstacle 31, the right tension band 17 and the right wheel well tension band 21 are subjected to stress and cause an additional energy absorption of the left frontal collision on the right side of the vehicle body.

Furthermore, in the case of a left frontal collision, the left tension band 17 is also subjected to stress when the left cantilever support member 3 is stressed. In particular, the moment acting on the left longitudinal member 1 is reduced, in particular, at the fastening device 9 of the cantilever support member 3; and the energy absorption is increased overall.

In the case of a right frontal collision, the stress on the corresponding elements is analogous.

Figure 6:
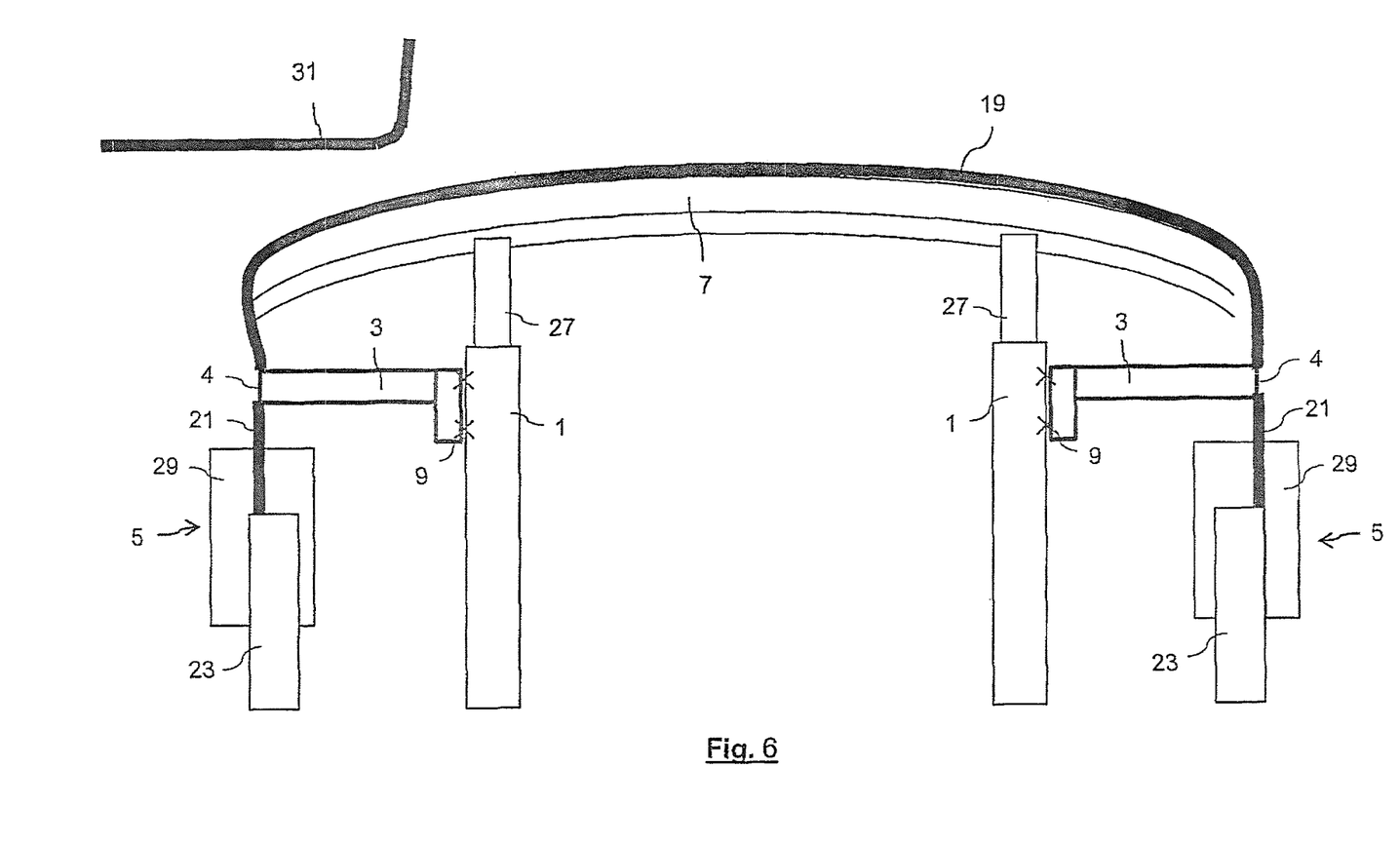
FIG. 6 is a schematic plan view of a front region of a vehicle body according to a sixth exemplary embodiment of the present invention.

FIG. 6 is a plan view of a front region of a vehicle body according to a sixth exemplary embodiment of the present invention. In particular, the sixth exemplary embodiment of the present invention represents a modification of the fifth exemplary embodiment of the present invention, so that only the differences with respect to the fifth exemplary embodiment are described below.

In contrast to the fifth exemplary embodiment, the vehicle body of the sixth exemplary embodiment has, instead of the left and right tension band 17, a single tension band 19. A left end of the tension band 19 is connected to a free end 4 of a left cantilever support member 3; and a right end of the tension band 19 is connected to a free end 4 of a right cantilever support member 3. At the same time the tension band 19 is arranged in such a way that it extends from the left cantilever support member 3 around an entire bumper cross member 7 to the right cantilever support member 3.

The tension bands of the fifth and sixth exemplary embodiments may be constructed from a metal strip or metal cable. As an alternative, the tension bands can also be constructed from a non metallic woven fabric tape. This woven fabric tape can be wrapped with a synthetic plastic material.

In a modification of the fifth and sixth exemplary embodiments it is also possible to omit the left and right wheel well tension band 21.

In an additional modification of the fifth and sixth exemplary embodiments it is also possible to omit the right and left tension band 17 and/or the tension band 19.

The tension bands 17 and 19, which are described in the fifth and sixth exemplary embodiments, as well as the wheel well tension bands 21 can also be combined with the first, second and third exemplary embodiments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body having a bumper cross member and a wheel mount, comprising:
   a longitudinal member, a front end of the longitudinal member being connected with the bumper cross member via a deformation unit arranged between the bumper cross member and the front end of the longitudinal member; and
   a cantilever support member structured as part of the vehicle body, which extends in essence transversely to the longitudinal member along a transverse axis of the vehicle and which is fastened at a first end in a torque resistant manner directly to the longitudinal member away from the deformation unit, and which is not fastened to another member between the first end and a free end opposite the first end;
   wherein the free end of the cantilever support member is arranged to protrude into an intermediate space between the wheel mount and the bumper cross member; and
   wherein, in an event of a frontal collision with a small overlap between an obstacle and the vehicle body, the cantilever support member absorbs energy and introduces the energy into the longitudinal member due to the torque resistant fastening of the cantilever support member directly to the longitudinal member.

2. The vehicle body according to claim 1, wherein the cantilever support member is a separate body element apart from the longitudinal member and is fixedly connected to the longitudinal member.

3. The vehicle body according to claim 2, wherein the fixed connection of the cantilever support member to the longitudinal member is at least one of a welded joint, a riveted joint and a threaded joint.

4. The vehicle body according to claim 1, further comprising:
a switchable structural element arranged between the free end of the cantilever support member and the bumper cross member.

5. The vehicle body according to claim 4, wherein
the switchable structural element is operatively configured such that, in an event of an impact at a speed greater than or equal to a threshold speed, said switchable structural element is rigid; and
in an event of an impact at a speed that is less than the directional speed, said switchable structural element is movable.

6. The vehicle body according to claim 5, further comprising:
a support element arranged on a side of the longitudinal member located opposite the cantilever support member; and
wherein the support member is configured to laterally support the longitudinal member when the cantilever support member is subjected to stress due to a frontal collision.

7. The vehicle body according to claim 5, further comprising:
a support element arranged on a side of the longitudinal member located opposite the cantilever support member; and
wherein the support member is configured to laterally support the longitudinal member when the cantilever support member is subjected to stress due to a frontal collision.

8. The vehicle body according to claim 1, further comprising:
a tension element operatively configured to connect the free end of the cantilever support member to the bumper cross member in a region of the longitudinal member.

9. The vehicle body according to claim 5, further comprising:
a tension element operatively configured to connect the free end of the cantilever support member to the bumper cross member in a region of the longitudinal member.

10. The vehicle body according to claim 6, further comprising:
a tension element operatively configured to connect the free end of the cantilever support member to the bumper cross member in a region of the longitudinal member.

11. The vehicle body according to claim 7, further comprising:
a tension element operatively configured to connect the free end of the cantilever support member to the bumper cross member in a region of the longitudinal member.

12. The vehicle body according to claim 1, further comprising:
a second longitudinal member and a second cantilever support member; and
wherein the longitudinal member and the second longitudinal member are configured as left and right longitudinal members of the vehicle body, respectively, and the cantilever support member and the second cantilever support member are configured as left and right cantilever support members of the vehicle body, respectively.

13. The vehicle body according to claim 12, further comprising:
a tension element operatively connecting a free end of the right cantilever support member to a free end of the left cantilever support member; and
wherein the tension element extends at least around front ends of the right and left longitudinal members.

14. The vehicle body according to claim 13, wherein the tension element extends around an entire outer circumference of the bumper cross member.

15. The vehicle body according to claim 12, further comprising:
a wheel tension element operatively arranged to connect a free end of the left cantilever support member to a front end of a left support strut.

16. The vehicle body according to claim 15, further comprising:
a second wheel tension element operatively arranged to connect a free end of the right cantilever support member to a front end of a right left support strut.

17. A motor vehicle, comprising:
a vehicle body having a bumper cross member and a wheel mount, the vehicle body comprising:
a longitudinal member, a front end of the longitudinal member being connected with the bumper cross member via a deformation unit arranged between the bumper cross member and the front end of the longitudinal member; and
a cantilever support member structured as part of the vehicle body, which extends in essence transversely to the longitudinal member along a transverse axis of the vehicle and which is fastened at a first end in a torque resistant manner directly to the longitudinal member away from the deformation unit, and which is not fastened to another member between the first end and a free end opposite the first end;
wherein the free end of the cantilever support member is arranged to protrude into an intermediate space between the wheel mount and the bumper cross member; and
wherein, in an event of a frontal collision with a small overlap between an obstacle and the vehicle body, the cantilever support member absorbs energy and introduces the energy into the longitudinal member due to the torque resistant fastening of the cantilever support member directly to the longitudinal member.

* * * * *